United States Patent
Oran

(10) Patent No.: US 10,187,680 B2
(45) Date of Patent: Jan. 22, 2019

(54) ADAPTIVE BIT RATE SYSTEM ARCHITECTURES USING NAMED DOMAIN NETWORKING

(71) Applicant: Cisco Technology, Inc., San Jose, CA (US)

(72) Inventor: Dave Oran, Cambridge, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/538,691

(22) Filed: Nov. 11, 2014

(65) Prior Publication Data

US 2016/0134915 A1 May 12, 2016

(51) Int. Cl.
  *H04N 21/2662* (2011.01)
  *H04N 21/2385* (2011.01)
  (Continued)

(52) U.S. Cl.
  CPC ..... *H04N 21/2662* (2013.01); *H04L 65/1083* (2013.01); *H04L 65/4084* (2013.01);
  (Continued)

(58) Field of Classification Search
  None
  See application file for complete search history.

(56) References Cited

U.S. PATENT DOCUMENTS 6,005,922 A * 12/1999 Longster ........... H04M 3/53325
  379/88.17
6,470,378 B1 * 10/2002 Tracton .................. H04L 29/06
  709/203

(Continued)

FOREIGN PATENT DOCUMENTS

WO 2013130473 A1 9/2013

OTHER PUBLICATIONS

Stefan Lederer, et al, "Adaptive Streaming over ICN", IETF 87 Proceedings, Jul. 28, 2013, pp. 1-22, XP055249196, Berlin, http://www.ieff.org/proceedings/87/slides/slides-87-icnrg-5.pdf.

(Continued)

*Primary Examiner* — Fernando Alcon
(74) *Attorney, Agent, or Firm* — Prateek Bhatnagar; Fernando & Partners, LLP

(57) ABSTRACT

In one implementation, a method includes obtaining a plurality of representations of a digital video asset. The plurality of representations may include a plurality of frames The method also includes generating first data comprising data indicative of temporal dependencies and frame decoding dependencies for the plurality of frames. The frame decoding dependencies may include a plurality of switching points between the plurality of representations of the digital video asset. The method further includes receiving a request for a first representation of the digital video asset from a first computing device and transmitting the first data to the first computing device based on the request. In another implementation, a method includes transmitting a request for a first representation of a plurality of representations of a digital video asset to a first computing device. The plurality of representations may include a plurality of frames. The method also includes receiving first data comprising data indicative of temporal dependencies and frame decoding dependencies for the plurality of frames based on the request. The frame decoding dependencies may include switching points between the plurality of representations of the digital video asset.

19 Claims, 9 Drawing Sheets

(51) Int. Cl.
   *H04N 21/647*   (2011.01)
   *H04N 21/234*   (2011.01)
   *H04L 29/06*    (2006.01)

(52) U.S. Cl.
   CPC ....... *H04L 65/608* (2013.01); *H04N 21/2385* (2013.01); *H04N 21/23406* (2013.01); *H04N 21/64738* (2013.01); *H04N 21/64769* (2013.01); *H04N 21/64776* (2013.01)

(56)  References Cited

U.S. PATENT DOCUMENTS

| | | | | |
|---|---|---|---|---|
| 6,778,553 | B1* | 8/2004 | Chou | H04H 20/42 370/465 |
| 7,885,338 | B1* | 2/2011 | Bushell | G11B 27/005 375/240.25 |
| 8,826,346 | B1* | 9/2014 | Panje | H04N 21/6587 386/343 |
| 2002/0131496 | A1* | 9/2002 | Vasudevan | H04N 21/2402 375/240.11 |
| 2003/0133694 | A1* | 7/2003 | Yeo | H04N 5/783 386/329 |
| 2005/0105883 | A1* | 5/2005 | Holcomb | H04N 21/8455 386/241 |
| 2006/0088094 | A1* | 4/2006 | Cieplinski | H04N 21/23406 375/240.01 |
| 2006/0156363 | A1* | 7/2006 | Wu | H04N 21/234327 725/113 |
| 2008/0259799 | A1* | 10/2008 | van Beek | H04L 47/2416 370/235 |
| 2011/0170410 | A1 | 7/2011 | Zhao et al. | |
| 2012/0013746 | A1* | 1/2012 | Chen | G11B 27/034 348/180 |
| 2012/0128061 | A1 | 5/2012 | Labrozzi et al. | |
| 2012/0317307 | A1* | 12/2012 | Ravindran | H04L 12/6418 709/238 |
| 2013/0042015 | A1* | 2/2013 | Begen | H04N 21/23439 709/231 |
| 2013/0246643 | A1* | 9/2013 | Luby | H04N 21/23439 709/231 |
| 2013/0290697 | A1 | 10/2013 | Wang et al. | |
| 2014/0189793 | A1 | 7/2014 | Kim et al. | |
| 2014/0365677 | A1* | 12/2014 | Mueller | H04L 65/80 709/231 |
| 2015/0149297 | A1* | 5/2015 | Mahadevan | G06Q 30/0269 705/14.66 |
| 2015/0248697 | A1* | 9/2015 | Mahadevan | G06Q 30/0255 705/14.53 |

OTHER PUBLICATIONS

International Search Report and Written Opinion for PCT/US2015/059651 dated Feb. 19, 2016.

* cited by examiner

US 10,187,680 B2

ADAPTIVE BIT RATE SYSTEM ARCHITECTURES USING NAMED DOMAIN NETWORKING

FIELD OF THE INVENTION

The present disclosure relates to adaptive bit rate system architectures. More specifically, the present disclosures relates methods and systems for providing digital video assets to client devices in adaptive bit rate system architectures.

BACKGROUND

Adaptive bit rate (ABR) streaming architectures may dynamically provide different representations (e.g., different bit rates) of a digital video asset (e.g., a movie, a video, etc.) to client devices. For example, a digital video asset may have multiple representations that differ in resolution (e.g., 1080P, 720P, 480P, etc.), encoding quality (e.g., quantization, motion compensation), and/or frame rate, that may result in a range of rendered video quality. The ABR system architecture may divide each version of the streaming video into smaller sized segments (e.g., segments that are 5 seconds long, 1 minute long, etc.). Based on changes in the bandwidth available to a client device, segments from different representations of the digital video asset may be provided to the client device. A client device may initially have low bandwidth and the ABR system architecture may initially provide segments from the low quality representation of the digital video asset to the client device. If the bandwidth of the client device increases, the ABR system architecture may start providing segments from a higher quality representation to the client device. Similarly, if bandwidth decreases, the ABR system architecture may switch to a lower quality representation that may be delivered at the lower bandwidth.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1:
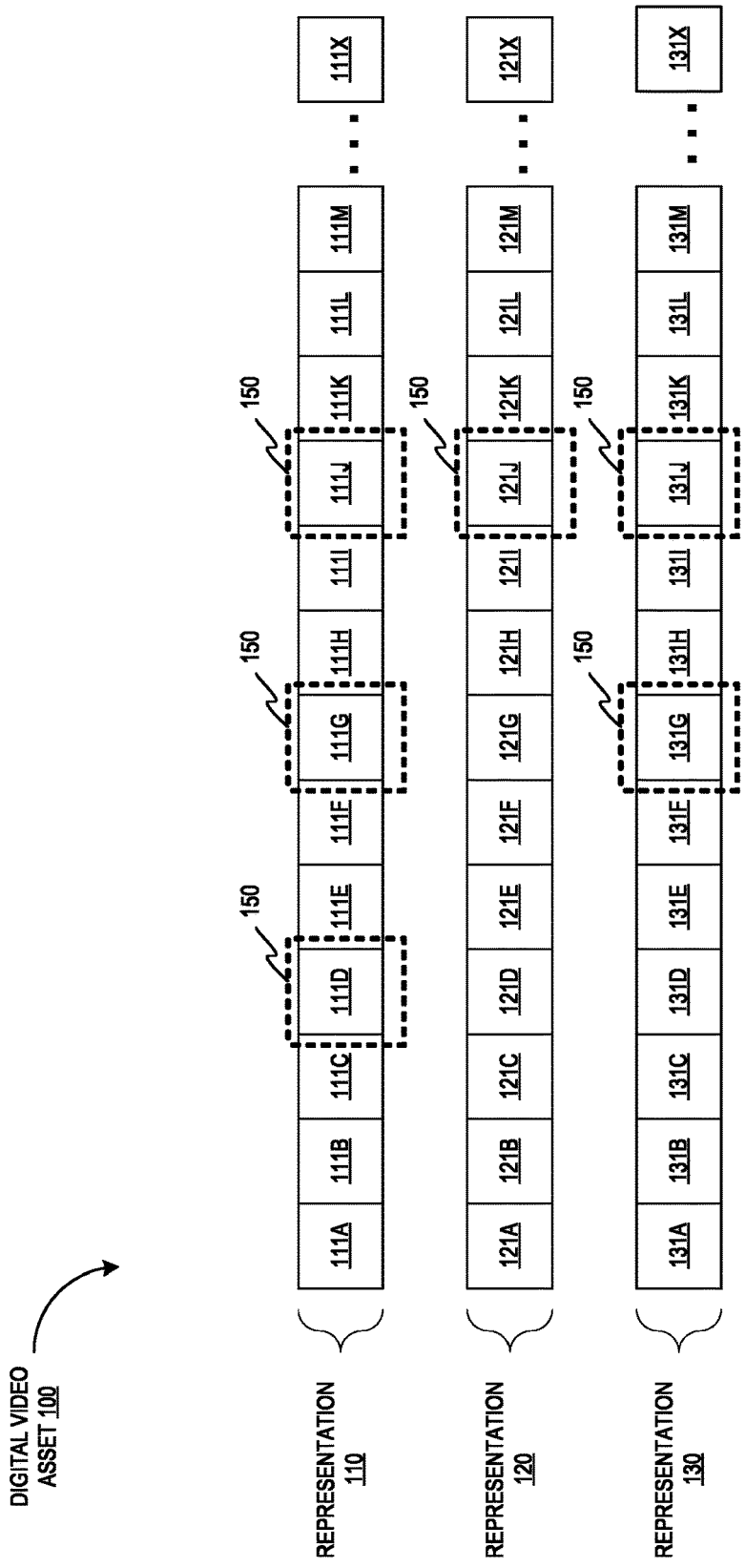
FIG. 1 is a block diagram illustrating representations of a digital video asset, in accordance with some embodiments.

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for providing digital video assets to client devices in adaptive bit rate system architectures. For example, in some implementations, a method includes obtaining a plurality of representations of a digital video asset. The plurality of representations may include a plurality of video frames. The method also includes generating first data comprising data indicative of temporal dependencies and frame decoding dependencies for the plurality of frames. The frame decoding dependencies may include a plurality of switching points between the plurality of representations of the digital video asset. The method further includes receiving a request for a first representation of the digital video asset from a first computing device and transmitting the first data to the first computing device based on the request.

In other implementations, a method includes transmitting a request for a first representation of a plurality of representations of a digital video asset to a first computing device. The plurality of representations may include a plurality of frames. The method also includes receiving first data comprising data indicative of temporal dependencies and frame decoding dependencies for the plurality of frames based on the request. The frame decoding dependencies may include switching points between the plurality of representations of the digital video asset.

Detailed Description

Generally, ABR system architectures use domain name system (DNS) lookups, hypertext transfer protocol (HTTP), and the Transmission Control Protocol (TCP) to provide representations of digital video assets to client devices. TCP enforces both in-order delivery and serialization of retransmission on when TCP segments are dropped or lost. Also, TCP does not accommodate multi-destination delivery of TCP packets (as would be possible in the IP protocol architecture by using multicast). Using HTTP limits the granularity of segments that may be requested due to the high cost of an HTTP transaction compared to a simple packet transmission. For example, instead of requesting specific frames of a digital video asset, a client device may be limited to requesting segments (e.g., multi-second segments which may include tens or hundreds of frames) of the digital video asset.

Information Centric Networking (ICN) system architecture are increasing in popularity. Examples of ICN system architectures include the Named Data Networking (NDN) system architecture and the Content-Centric Networking (CCN) system architecture. An ABR video system architecture that uses an underlying ICN system architecture (e.g., NDN, CCN, etc.) may allow client devices to request a digital video asset at smaller granularities (e.g., may allow client devices to request specific frames of a digital video asset) because the transaction cost for requesting a frame may be smaller than that of an HTTP transaction.

In some embodiments, an ABR system architecture may use an NDN system architecture. In the NDN system architecture, consumers (e.g., client devices such as laptop computers, smartphones, etc.) may send interest packets that request a piece of data by name. The interest packets may be routed to a producer of the data (e.g., a server computer) along a path and the producer may transmit a data packet (e.g., an NDN data object) to the consumer along a reverse path. The producer may generate data indicative of temporal dependencies and frame decoding dependencies between frames of the digital video asset (e.g., may generate a graph). The producer may transmit the data to the consumer when the consumer requests the digital video asset. The NDN system architecture may also allow the ABR system architecture to reduce congestion and/or bandwidth usage because routers may cache the data and may also provide the requested data to consumers. A CCN architecture may also use interest packets (e.g., CCN interest packets) and names (e.g., CCN names) to fetch data (e.g., CCN data objects).

In some embodiments, graph may allow the consumer to improve and/or optimize the playback of the digital video asset on a frame-by-frame basis. For example, the consumer may request frames with a higher importance (e.g., frames which contribute more to the quality of the rendered video than other frames) first in order to avoid decoding errors and stalls in the playback of the digital video asset. This may also allow for error concealment rather than stalls when the consumer is unable to fetch (e.g., request and receive) all of the frames for a portion of the digital video asset. For example, the two i-frames bracketing a Group of Pictures (GOP) can be fetched first, followed by the p-frames, followed by the b-frames. If the consumer is unable to fetch the one or more b-frames, the consumer may still continue playback of the digital video asset with the i-frames and the p-frames (e.g., using the frames i-frames and p-frames that were received). In addition, if there are errors in fetching a frame (e.g., a frame is corrupted or not received), the consumer may re-request (e.g., re-send interest packets) for a specific frame, instead of requesting an entire segment (e.g., tens or hundreds of frames) of the digital video asset. In one embodiment, the graph may also reduce the amount of processing load for the producers.

Although the present disclosure may refer to the NDN system architecture, it should be understood that the NDN system architecture is merely an example architecture that may be used in an ABR system architecture. Other embodiments may use other types of system architectures (e.g., CCN, Pursuit, NetInf, etc.) in the ABR system architecture and the examples, implementations, and/or embodiments described herein may be used with the other types of system architectures.

FIG. 1 is a block diagram illustrating representations 110, 120, and 130 of a digital video asset 100, in accordance with some embodiments. The digital video asset 100 may be an N×M matrix of frames, where "N" is the number of frames in each of the representations 110, 120, and 130 and where M is the number of representations. For example, if there are 1000 frames in each of the representations 110, 120, and 130, the digital video asset 100 may be a 1000×3 matrix of frames. Examples of digital video assets may include movies, sports videos, newscasts, music and concert videos, and various other types of TV programs, online videos, streaming videos, etc.

As discussed above, representations 110, 120, and 130 may be different versions of the digital video asset 100. The representations 110, 120, and 130 may have different video quality metrics. For example, representation 110 may be encoded at a higher bit rate than representation 120 and representation 120 may be encoded at a higher bit rate than representation 130. In another example, representation 110 may have a higher resolution (e.g., in pixels) than representation 120 and representation 120 may have a higher resolution than representation 130. Other examples of video quality metrics (that may differ between the representations 110, 120, and 130 of the digital video asset 100) include, but are not limited to, the resolution of a frame, a bit rate, sharpness of a frame (e.g., the amount of detail in the frame), an amount of noise in the frame, color range of the frame (e.g., the amount of colors in the frame), etc. Representation 110 includes frames 111A through 111X, representation 120 includes frames 121A through 121X, and representation 130 includes frames 131A through 131X. The frames 111A through 111X, 121A through 121X, and 131A through 131X may include intra-coded frame (i-frames), predicted frames (p-frames), and bi-predictive frames (b-frames).

In one embodiment, the frames 111A through 111X, 121A through 121X, and 131A through 131X may be synchronized in time. For example, each frame may be associated with a presentation timestamp (PTS) or a Society of Motion Picture and Television Engineers (SMPTE) time code. The PTSs for frames 111A, 121A, and 131A may be the same, the PTSs for 111B, 121B, and 131B may be the same, the PTSs for 111C, 121C, and 131C may be the same, etc.

The digital video asset 100 may be included in an ABR system/architecture. The ABR system/architecture may allow a client device to switch among the representations 110, 120, and 130 of the digital video asset 100. For example, the digital video asset 100 may have a high quality (e.g., a 1080P quality) representation, a medium quality representation (e.g., 720P), and a low quality (e.g., a 320P quality) representation. The client device may switch among the different representations 110, 120, and 130 at switching points 150. Switching points 150 may be frames where the client device may be allowed to switch from one representation to another. One type of switching point may be a switching frame. A switching frame may be a frame of the digital video asset that may depend on frames from different representations of the digital video asset (e.g., the switching frame may be decoded using frames from different representations of the digital video asset). Another type of switching point may be an instantaneous decoder refresh (IDR) frame. An IDR frame may be a type of i-frame that indicates that frames after the IDR frame (e.g., frames with PTSs after the IDR frame) do not depend on frames before the IDR frame. A further type of switching point may be a p-frame. For example, a client device may switch from a first representation to a second representation at a successive p-frame in the second representation.

In one embodiment, each of the frames 111A through 111X, 121A through 121X, and 131A through 131X may be stored in a NDN data object. For example, frame 111A may be stored in a first NDN data object, frame 131A may be stored in second NDN data object, etc. In another embodiment, one or more of the frames 111A through 111X, 121A through 121X, and 131A through 131X may be stored in multiple NDN data objects (e.g., divided across multiple NDN data objects). For example, frame 121A may be larger than the size (e.g., payload) of an NDN data object. The frame 121A may be divided into multiple chunks (e.g., multiple pieces, portions, segments, etc.) and each chunk of the frame 121A may be stored in an NDN data object.

In one embodiment, each NDN data object (e.g., each NDN data object that includes a frame or a chunk of a frame) may have a name that may be used to identify and/or refer to the NDN data object (e.g., may be used to identify and/or refer to the frame or chunk of a frame in the NDN data object). The name for an NDN data object may be unique for the ABR video system architecture. The name for an NDN data object may be structured hierarchically and may include multiple parts or portions. The parts or portions of the name for an NDN data object may be any value (e.g., binary strings/values, alphanumeric values) separated by delimiters (e.g., text or values used to separate or delineate the parts or portions of the name). The name for an NDN object may also be referred to as an NDN name.

In one embodiment, one portion of the name for an NDN data object may include a name prefix. The name prefix may be information (e.g., text) that is used to identify the digital video asset. For example, the name prefix may indicate one or more of a studio that produced the digital video asset, a director, an actor, a channel (e.g., a television channel) that broadcasts the digital video asset, a title for the digital video asset (e.g., the title of a movie), a season of the digital video asset (e.g., a season of a television sitcom), an episode of the digital video asset, etc. In another embodiment, one portion of the name for an NDN data object may include a representation indicator. The representation indicator may be information that is used to identify the representation of a digital video asset that includes the frame identified by the name. Examples of representation indicators include, but are not limited to "1080P," "720P," "HQ," "LQ," "HD," "SD," etc. In a further embodiment, one portion of the name for an NDN data object may include a frame sequence. The frame sequence may information that is used to indicate an order of a frame within a representation. For example, the frame sequence may be a number or integer (e.g., 1, 2, 3 . . . 2335, etc.). In another example, the frame sequence may be a timestamp or time code, such as an SMPTE time code or a PTS.

In one embodiment, the one portion of the name for an NDN data object may include a chunk number. As discussed above, a frame of a representation may be larger than the size (e.g., payload) of an NDN data object and the frame may be divided (e.g., split) into multiple chunks. The chunk number may be information that is used to identify different chunks of a frame. For example, the chunk number may be a number (e.g., an integer). In another embodiment, one portion of the name for an NDN data object may include a hash (e.g., a cryptographic hash) of the content of the frame or chunk of the frame. For example, a hash may be generated and/or obtained using a hash function (e.g., SHA-1, MD5, etc.) on the frame or chunk of the frame. The hash may allow the name of the NDN object to be self-certifying (e.g., the content of the NDN object may be verified by using the portion of the name that includes the hash). In one embodiment, the hashes for the different chunks of a frame may also be included as part of the frame information for a frame.

It is understood that various schemas and/or formats may be used when generating names for NDN objects (that include frames and/or chunks of frames). The names and/or portions of the names described herein are examples and other embodiments may use other schemas and/or formats to name NDN objects (e.g., to name frames or chunks of frames).

Figure 2:
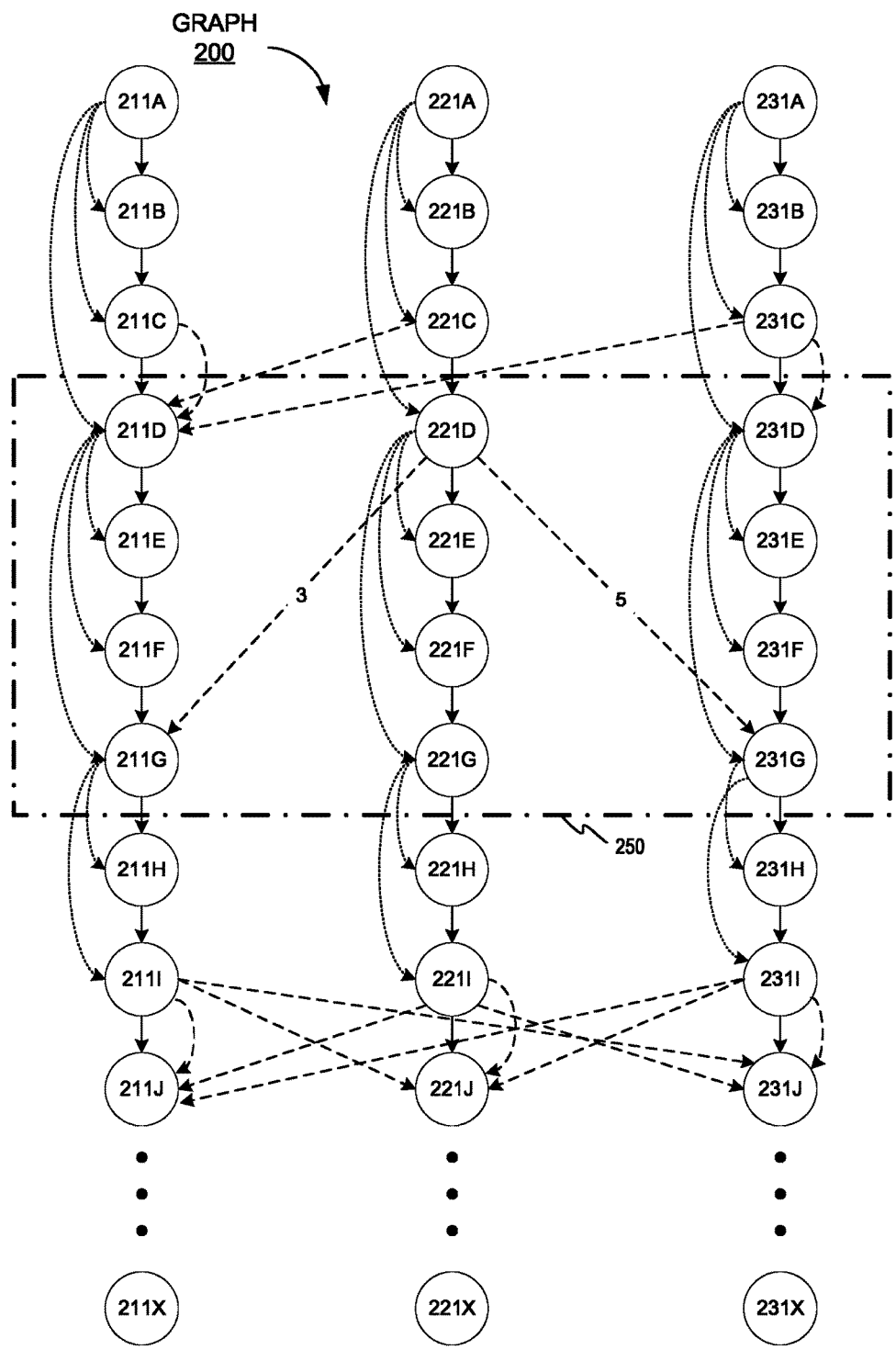
FIG. 2 is a block diagram illustrating a graph, in accordance with some embodiments.

FIG. 2 is a block diagram illustrating a graph 200, in accordance with some embodiments. As discussed above in conjunction with FIG. 1, a digital video asset may include multiple representations (e.g., digital video asset 100 includes representations 110, 120, and 130). In one embodiment, the graph 200 may represent the frames of a digital video asset using the nodes of the graph 200. The graph may include N×M number of nodes, where N is the number of frames in the representations of the digital video asset and M is the number of representations in the digital video asset. Each node in the graph 200 may represent a frame from the digital video asset (e. g., each node may be associated with a frame in the digital video asset). For example, referring to FIG. 1, the nodes 211A through 211X represent the frames 111A through 111X of representation 110, the nodes 221A through 221X represent the frames 121A through 121X of representation 120, and the nodes 231A through 231X represent the frames 131A through 131X or representation 130. The graph 200 also includes arcs between the nodes 211A through 211X, 221A through 221X, and 231A through 231X. The arcs may represent temporal dependencies and frame decoding dependencies between the frames of the digital video asset (as discussed in more detail below). The arcs may also be referred to as edges or lines. In one embodiment, the graph 200 is an acyclic directed graph (digraph). It shall be understood that in other embodiments, the frames, temporal dependencies, and/or frame decoding dependencies may be represented using other types of graphs, data representations, and/or data structures.

The nodes 211A through 211X, 221A through 221X, and 231A through 231X may include additional information and/or data about respective frames. The additional information and/or data about the respective frames may be referred to as frame information. For example, referring back to FIG. 1, node 211A may include information about frame 111A, node 211B may include information about frame 111B, etc. In one embodiment, the frame information may include the total size of the frame in bytes (e.g., the total storage size of the frame). For example, referring back to FIG. 1, the frame information for node 211A may indicate that frame 111A is 4096 bytes. It is understood that in other embodiments, the size of the frame (e.g., the storage size) may be represented using other units (e.g., kilobytes, megabytes, etc.).

In another embodiment, the frame information may include an importance level of a frame. The importance level of a frame may indicate how important a frame is relative to other frames in the digital video asset. For example, as discussed above, a frame in a digital video asset may be an i-frame, a p-frame, or a b-frame. An i-frame may be considered to be more important than a p-frame and a b-frame. A p-frame may be considered more important than a b-frame. The importance level of the frame may be a number, text, an alphanumeric value, etc. For example, the value "1" may indicate that a frame has a high level of importance (e.g., an i-frame), the value "2" may indicate that a frame has a medium level of importance (e.g., a p-frame), and the value "3" may indicate that a frame a low level of importance (e.g., a b-frame). In other embodiments, there may be any number of importance levels (e.g., 6 importance levels, 10 importance levels, etc.).

In one embodiment, the frame information may include one or more video quality metrics. The one or more video quality metrics may indicate the video quality for a frame. For example, the video quality metrics may indicate the resolution of a frame, a bit rate, sharpness of a frame (e.g., the amount of detail in the frame), an amount of noise in the frame, color range of the frame (e.g., the amount of colors in the frame), etc. The one or more video quality metrics may also be referred to as a group of video quality metrics, a set of video quality metrics, or a vector of video quality metrics.

In one embodiment, the graph 200 may represent the temporal dependencies of frames (e.g., the order of frames) in the representations of the digital video asset. For example, referring to FIG. 1, the graph 200 may represent the order of frames 111A through 111X within representation 110, the order of frames 121A through 121X within representation 120, and the order of frames 131A through 131X within representation 130. The temporal dependencies of the frames of the digital video asset are represented using solid arcs (e.g., solid lines or solid edges) between the nodes. For example, referring back to FIG. 1, the solid arc between node 221B and 221C may indicate that the frame 121B is after (e.g., is displayed after) frame 121C.

In another embodiment, the graph 200 may represent the frame decoding dependencies of the frames in the representations of the digital video asset. The frame decoding dependencies may indicate inter-frame dependencies for decoding frames. For example, a p-frame may depend on a previous i-frame in order to be properly decoded (e.g., the previous i-frame may be used to decode the p-frame). The dotted arcs in the graph 200 may represent the frame decoding dependencies of the frames of the digital video asset. The dotted arcs (e.g., lines) may indicate which frames are possible successors to a frame. For example, referring to FIG. 1, frame 111A (represented by node 211A) may be an i-frame and frame 111B (represented by node 211B) may be a b-frame that depends on frame 111A to be properly decoded. The dotted arc between node 211A and 211B may indicate that frame 111B is dependent on frame 111A and that frame 111B is a possible successor to the frame 111A. In one embodiment, a first frame may be a possible successor to a second frame if the first frame may be decoded using the second frame. In another embodiment, the first frame may be a possible successor to a second frame if first frame may be decoded without using the second frame.

In one embodiment, the frame decoding dependencies may indicate switching points in the digital video asset. One type of switching point may be a switching frame. A switching frame may be a frame of the digital video asset that may depend on frames from different representations of the digital video asset. For example, referring back to FIG. 1, frame 111D may be a switching frame. Frame 111D may be decoded using frame 111C (represented by node 211C), frame 121C (represented by node 221C), or 131C (represented by node 231C). Multiple dashed arcs lead to node 211D from node 211C, 221C, and 231C because the frame 111D may be a switching frame and thus, may be a successor frame to frames 111C, 121C, and 131C. The multiple dashed arcs leading to the node 211D may also indicate that the frame 111D is a switching frame.

Another type of switching point may be an instantaneous decoder refresh (IDR) frame. For example, referring to FIG. 1, frame 111J (represented by node 211J), frame 121J (represented by node 221J), and frame 131J (represented by node 231J), may be IDR frames. Frames with a PTS after the PTS for frames 111J, 121J, and 131J may not depend on frames before the frames 111J, 121J, and 131J because the frames 111J, 121J, and 131J may be IDR frames. Multiple dashed arcs lead to nodes 211J, 221J, and 231J because the frames 111J, 121J, and 131J may be IDR frames and thus, may be a successor frames to previous frames (e.g., frame 111J may be a successor frame to frame 111I, 121I, and 131I). The multiple dashed arcs leading to the nodes 211J, 221J, and 231J may indicate that the frames 111J, 121J, and 131J are IDR frames.

A further type of switching point may be a p-frame. For example, as discussed above, the frames in a digital video asset may be synchronized in time. Switching from a p-frame of a first representation to a second representation at a successive p-frame may cause the video quality of the playback of the digital video asset to decrease or degrade (even when switching from a lower to a higher overall video quality representation). For example, the successive p-frame (e.g., the switching point) may not include enough data to decode the frames of the second representation. This decrease in video quality may be indicated by labeling the dashed arc with a quality loss metric. The quality loss metric may be one or more values that may indicate the amount of decrease in the video quality if a client device switches between representations at the p-frame (e.g., at the switching point). For example, the quality loss metric may be a number on scale of 1 to 10, where 10 represents a high amount of decrease in video quality and 1 represents a small amount of decrease in video quality. Referring to FIG. 1, frame 121D (represented by node 221D) may be a p-frame of a first representation (e.g., representation 120) and frames 111G (represented by node 211G) and 131G (represented by node 231G) may be a successive p-frames from different representations (e.g., representations 110 and 130). The dashed arc from node 221D to 211G is labeled with the value "3" to indicate the amount of decrease in video quality if a client devices switches to the representation 110. The dashed arc from node 221D to 231G is labeled with the value "5" to indicate the amount of decrease in video quality if a client devices switches to the representation 130.

In other embodiments, the graph 200 may indicate frame decoding dependencies in various ways. For example, the graph 200 indicates frame decoding dependences by using dashed acts to indicate which frames are feasible successors (e.g., feasible successor frames) to a given frame. Thus, the dashed arcs (that represent the frame decoding dependencies go forward or down). In another example, the graph 200 may indicate which frames a given frame depends one (e.g., which frames are used to decode a given frame). Thus, the dashed arcs may go backwards (e.g., upwards) to a previous frame (not show in the figures).

In one embodiment, the digital video asset may be digital video asset of a live event (e.g., a live digital video asset). For example, the digital video asset may be updated (e.g., frames and/or representations may be added) while a live event is occurring or in progress. In one embodiment, the graph 200 may be updated as event occurs. For example, the live event may be a press conference. The ABR system architectures may update the graph 200 periodically (e.g., every few seconds, minutes, etc.) as the press conferences progresses. In another embodiment, the ABR system architecture may create a different graph for different portions of the live event. For example, the ABR system architecture may create a different graph for every few seconds, minutes, etc., of the live event. The different graphs may represent the temporal dependencies and/or frame decoding dependencies for the frames that are in a respective portion of the live event.

Figure 3:
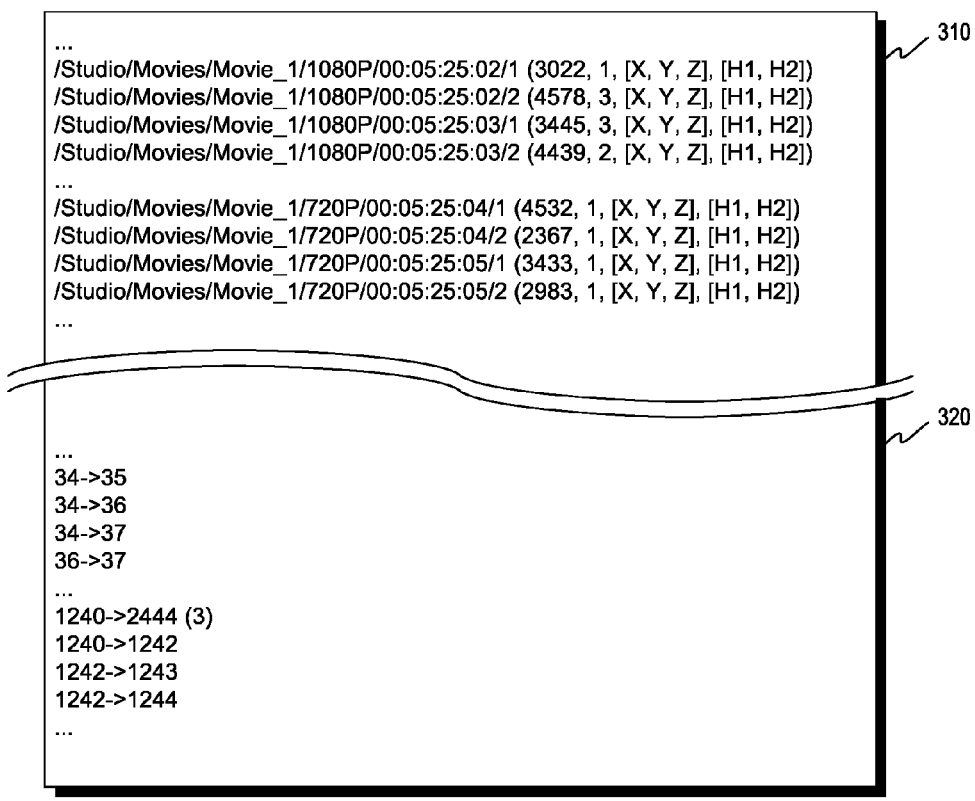
FIG. 3 is a diagram illustrating an example manifest file, in accordance with some embodiments.

FIG. 3 is a diagram illustrating an example manifest file 300, in accordance with some embodiments. As discussed above, an ABR system architecture may generate a graph (e.g., graph 200 illustrated in FIG. 2) for a digital video asset of the ABR system architecture. The graph may indicate the temporal dependencies (e.g., the playback order) of frames in the digital video asset and may indicate the frame decoding dependencies of the frames in the digital video asset. The ABR system architecture may use one or more manifest files to provide data indicative of the graph to a client device. For example, the manifest file may include a list of the frames in the digital video asset (e.g., a list of the frames in each representation of the digital video asset) and may indicate the temporal dependences and the frame decoding dependences of the frames in the digital video asset.

As illustrated in FIG. 3, the manifest file 300 includes portion 310 and portion 320. In one embodiment, portion 310 includes an entry (e.g., a line) for each frame of the digital video asset. The entries (e.g. lines) include names (e.g., NDN names) for NDN objects that include the frames and/or chunks of frames for the digital video asset. For example, portion 310 includes an entry with the name "/Studio/Movies/Movie_1/1080P/00:05:25:02/2" which may identify frame 2 of the movie "Movie_1" at the time 00:05:25 (e.g., 5 minutes and 25 seconds). The names included in the portion 310 may also identify the frames of the digital video asset (e.g., frames in the different representations of the digital video asset). As discussed above, the NDN names may also include a portion to identify different chunks of a frame (not shown in FIG. 3) when the size of frames (e.g., size in bytes) of the digital video asset are larger than the size of an NDN object (e.g., larger than the payload of an NDN object). Also as discussed above, the NDN names may optionally include a hash (e.g., a cryptographic hash) that may be used to verify and/or authenticate the contents of an NDN data object (e.g., used to verify and/or authenticate the frame or chunk of the frame).

In one embodiment, each entry also includes frame information for a frame of the digital video asset. As discussed above, the frame information for a frame may include one or more of the size of the frame (e.g., size in bytes of kilobytes), an importance level of the frame, one or more video quality metrics (e.g., a set, group, or vector of video quality metrics), and a set of hashes (e.g., cryptographic hashes). The set of hashes may be used to verify and/or authenticate the chunks of the frame. The set of hashes may be in the order that the chunks are listed in portion 310. As illustrated in FIG. 3, each entry includes a name for a frame of the digital video asset and frame information for the frame. For example, the second entry (e.g., the second line) of portion 310 includes the name "/Studio/Movies/Movie_1/1080P/00:05:25:02/2" that identifies frame 2 of the movie "Movie_1" at the time 00:05:25 (e.g., 5 minutes and 25 seconds). Frame 2 of the movie "Movie_1" at the time 00:05:25 is associated with the frame information "(4578, 3, [X, Y, Z], [H1, H2])." The number "4578" may indicate that the size of the frame is 4578 bytes. The number "3" may indicate the importance level of the frame (e.g., may indicate that the frame has low importance). The values [X, Y, Z] may indicate video quality metric for the frame (e.g., video quality metric X may be resolution, video quality metric Y may be sharpness, video quality metric Z may number of colors, etc.). The values [H1, H2] may be hash values for chunks of the frame 2 of the movie "Movie_1" at the time 00:05:25. For example, the frame may be divided into two chunks. H1 may be a hash of the first chunk and H2 may be a hash of the second chunk.

In one embodiment, the manifest file 300 may also include a portion (not shown in FIG. 3) to indicate temporal dependencies of the frames of the digital video asset (e.g., a temporal order of the frames based on the PTSs of the frames). For example, the order of the frames in the digital asset may not be ascertainable based on the names in portion 310 (e.g., the names of the frames in portion 310 may not be listed in temporal order). The portion may include text and/or other values to indicate the temporal dependencies of the frames of the digital video asset. The portion that indicates the temporal dependencies may also use identifiers for the frames. For example, the portion may include the following text "A->B." This may indicate that the frame with the identifier B is the next consecutive frame after frame with the identifier A. Various values may be used for the identifiers. For example, the identifiers may be a part of a name in the portion 310. In another example, each name in the portion 310 may be associated with an index value (e.g., the first name is associated with the index value "1," the second name is associated with the index value "2", etc.). The index values (e.g., numbers) may be used to indicate temporal order of the frames.

As illustrated in FIG. 3, the manifest file 300 does not include a portion to indicate temporal dependencies of the frames of the digital video asset because the temporal order of the frames may be ascertained based on the names in the portion 310. For example, the names in the portion 310 include portions that indicate the PTS of a frame (e.g., the portions of the names include a PTS with the format HH:MM:SS:FF, where HH is the hour, MM is the minute, SS is the second, and FF is the frame). The temporal dependencies (e.g., temporal order) of the frames may be determined based on the PTSs in the names.

Portion 320 includes an entry (e.g., a line) for each frame decoding dependency of the frames of the digital video asset. For example, referring back to FIG. 2, portion 320 may include an entry for each dashed arc and dotted arc in the graph 200. As illustrated in FIG. 3, some of the entries have a first format "X->Y" indicating that frame Y is a possible successor frame to frame X. Other entries may have a second format "X->Y (Z)." The second format may indicate that frame Y is a possible successor frame to frame X and may indicate the quality loss metric (e.g., "Z") associated with the arc. For example, referring back to FIG. 2, an arc may identify a switching point between two successive p-frames of different representations. The arc may include a quality loss metric to indicate the amount of decrease in video quality if playback switches to the representation containing the frame Y. In one embodiment, the entries in the portion 320 may use an enumeration of the frames included in portion 310. The enumeration may be implicit (e.g., the lexical order of an entry in the portion 310 may be used to identify the frame for the entry). For example, the first entry may be enumerated as "1", the second entry may be enumerated as "2", etc. The enumeration may also be explicit. For example, each entry in portion 310 may include an extra field (e.g., an index number or other identifier) that is used to identify the entry.

Figure 4:
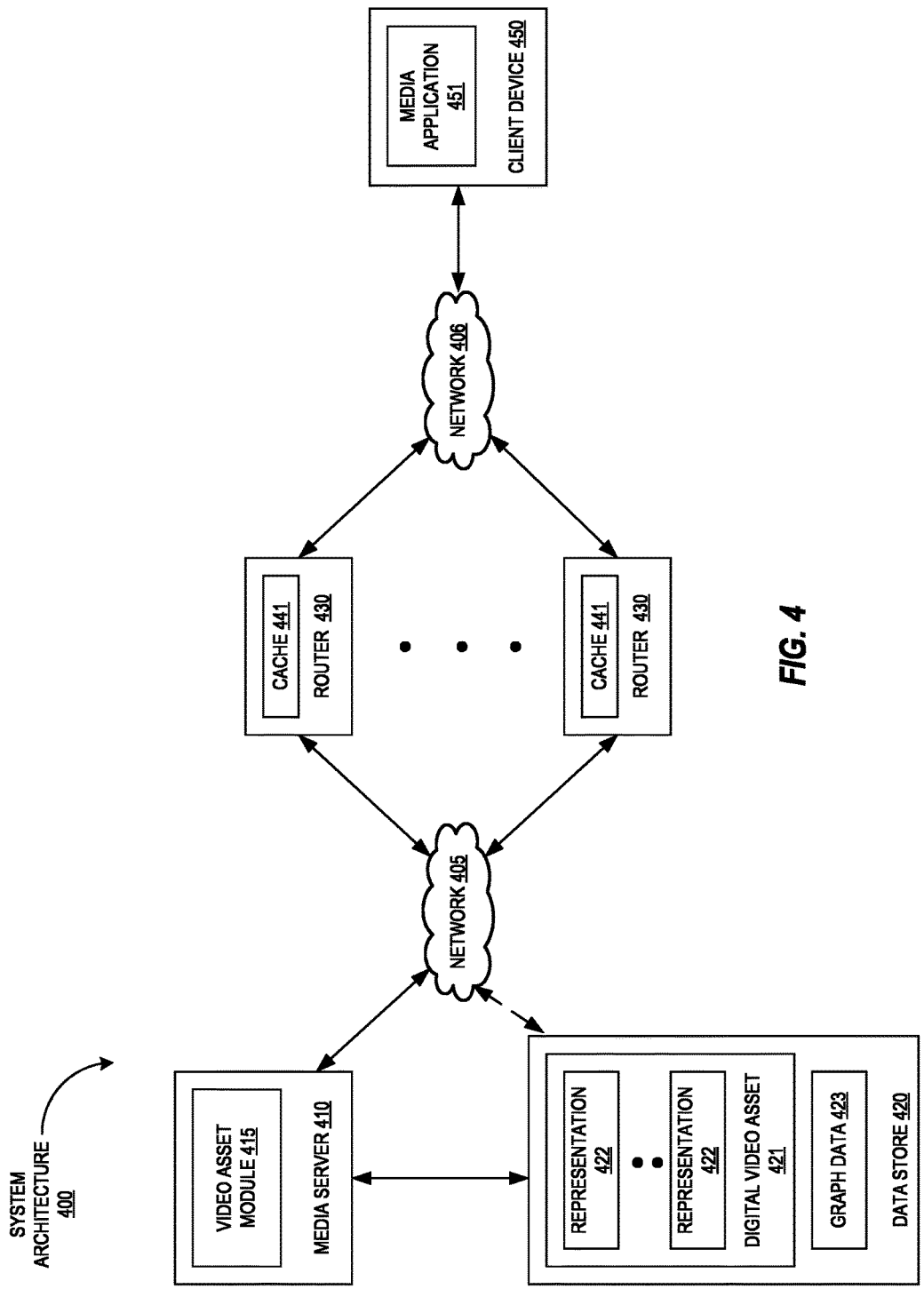
FIG. 4 is a block diagram illustrating a system architecture, in accordance with some embodiments.

FIG. 4 is a block diagram illustrating a system architecture 400, in accordance with some embodiments. The system architecture includes a media server 410, a data store 420, network 405, network 406, routers 430, and client device 450. The system architecture 400 may be an ABR system architecture. As discussed above, an ABR system architecture may allow a client device to switch between different representations of a digital video asset during playback of the digital video asset (e.g., switch to a higher quality representation or a lower quality representation based on changes in bandwidth). The system architecture 400 may also be an NDN system architecture. For example, the system architecture 400 may use interest packets to request data and may use data objects (e.g., NDN data objects) to transmit the requested data. The media server 410 may be referred to as a producer and the client device 450 may be referred to as a consumer or a requestor The media server 410 may be one or more computing devices (such as a rack-mount server, a router computer, a server computer, a personal computer, a mainframe computer, a smartphone, a personal digital assistant (PDA), a laptop computer, a tablet computer, a desktop computer, etc.). The client device 450 may also be a computing device (e.g., a personal computer, a smartphone, a personal digital assistant (PDA), a laptop computer, a tablet computer, a desktop computer, etc.). The network 405 and/or network 406 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. The data store 420 may be may be a memory (e.g., random access memory), a cache, a drive (e.g., a hard drive), a flash drive, a database system, or another type of component or device capable of storing data. The data store 420 may also include multiple storage components (e.g., multiple drives or multiple databases) that may also span multiple computing devices (e.g., multiple server computers). The data store 420 includes the digital video asset 421 and the digital video asset 421 includes representations 422. The data store 420 also includes graph data 423. The graph data 423 may be data indicative of temporal dependencies and/or frame decoding dependencies for the frames in the digital video asset 421. For example, the graph data 423 may include the manifest file 300 illustrated in FIG. 3 and/or other representations of the graph 200 illustrated in FIG. 2. In one embodiment, the media server 410 may be directly coupled to the data store 420. In another embodiment, the media server may be couple to the data store 420 via the network 405.

The media server 410 includes a video asset module 415. The digital video asset 421 include multiple representations 422. In one embodiment, the video asset module 415 may generate NDN objects for the frames of the digital video asset 421 (e.g., for the frames in the representations 422 of the digital video asset 421). For example, the video asset module 415 may generate an NDN object for each frame of the digital video asset 421. In another example, the video asset module 415 may divide the frames of the digital video asset 421 into chunks and may generate an NDN object for each chunk (as discussed above in conjunction with FIGS. 1-3). The video asset module 415 may also generate names (e.g., NDN names) for each NDN object (as discussed above in conjunction with FIGS. 1-3). In one embodiment, the video asset module 415 may be part of a video encoder and the video encoder may produce and/or generate the digital video asset 421 (e.g., may generate the different representations 422). In another embodiment, the video asset module 415 may be separate from the video encoder.

The video asset module 415 may analyze the representations 422 of the digital video asset 421. The video asset module 415 may identify temporal dependencies and/or frame decoding dependencies for the frames of the digital video asset 421. For example, the video asset module 415 may analyze a frame of the digital video asset 421 and may determine whether the frame depends on other frames in the digital video asset 421 (e.g., whether the frame depends on other frames in the video asset 412 to be decoded properly). In another example, the video asset module 415 may analyze PTSs for the frames to identify temporal dependencies (e.g., the temporal order) for the frames.

In one embodiment, the video asset module 415 may generate a graph (e.g., graph 200 illustrated in FIG. 2) that may represent the frames of the digital video asset 421, the temporal dependencies, and/or the frame decoding dependencies of the frames (as discussed above in conjunction with FIGS. 1-3). The video asset module 415 may also generate a manifest file that includes and/or represents the graph (as discussed above in conjunction with FIGS. 1-3). The video asset module 414 may receive requests (e.g., interest packets) for one or more of the representations 422 from the client device 450 (e.g., from media applications 451) and the video asset module 414 may provide the manifest file to the client device 450. The client device 450 may send additional requests (e.g., additional interest packets) for frames of the representations 422 and the video asset module 415 may also send NDN data objects (which may include frames or chunks of frames) to the client device 450 based on the requests for frames received from the client device 450.

The client device 450 includes a media application 451. Media application 451 may be an application (e.g., a web browser, an embedded media player, a standalone application) that allows users to view or consume the digital video asset. As discussed above, media application 451 may request a representation 422 of the digital video asset 421 (e.g., may transmit an interest packet to request representation 422). The media application 451 may receive a graph (e.g., a manifest file or other data) from the video asset module 415 based on the request. The media application 451 may use and/or include a buffer (e.g., a data buffer or cache) to store frames of the digital video asset. The buffer may allow the media application 451 to continue playback of the digital video asset while the media application 451 fetches (e.g., requests and receives) frames of the digital asset. For example, if there is congestion (e.g., delays in transmitting/receiving data and/or decreases in bandwidth) in one or more of the networks 405 and 406, the media application 451 may continue playback using frames stored in the buffer until the congestion decreases. If there are no frames in the buffer and the media application 451 is unable (e.g., temporarily unable) to fetch additional frames, the playback of the digital video asset may stall (e.g. playback may pause or stutter).

In one embodiment, the media application 451 may adjust the playback of the digital video asset based on one or more of the graph, the amount of available space in the buffer, the current bandwidth usage of the client device 450, and/or an estimated bandwidth usage of the client device 450. For example, the media application 451 may determine an estimated amount of bandwidth for the client device 450 (e.g., determine how much bandwidth the client device 450 may have over a period of time). The media application 451 may analyze the graph and the buffer and may identify a set of frames to request based on the estimated amount of bandwidth and the amount of available space in the buffer (as discussed in more detail below). This may allow the media application 451 to manage the buffer and the playback of the digital video asset at the granularity of frames (e.g., on a frame by frame basis) instead of at a coarser granularity (e.g., at a granularity of multi-second segments). In one embodiment, the media application 451 may use one or more guidelines when adjusting the playback of the digital video asset. One guideline may be that the buffer should remain non-empty because the playback of the digital video asset may stall if the buffer is empty. Another guideline may be that the current or instantaneous bandwidth used by the client device 450 should not be too large (in order to prevent the client device 450 from using too much bandwidth if the media server 410 does not implement bandwidth/congestion control). A further guideline may be that the temporal dependencies and/or frame dependencies of the frames should be followed to allow the digital video asset to play properly. Another guideline may be that the media application cannot overfill the buffer (e.g., cannot fetch more frames than the buffer may store).

In one embodiment, the media application 451 may determine (e.g., calculate) an estimated bandwidth by analyzing the amount of bandwidth used by the client device 450 (e.g., the amount of frames fetched) over an interval/period of time. For example, the media application 451 may determine the estimated bandwidth by determining the fetch latency (e.g., round trip time (RTT)) to fetch one or more frames (e.g., the time it takes to request and receive the one or more frames). When the media application 451 first begins playback of the digital video asset and fetches some initial frames, the media application 451 will not have fetched frames for the interval of time. For example, if the interval of time is 10 seconds and the media application 451 has just started playback of the digital video asset for 3 seconds (e.g., has only fetched frames for 3 seconds), then then interval of time has not been reached. The media application 451 may use the fetch latency of the initial frames to determine an initial estimated bandwidth. The initial estimated bandwidth may be inaccurate and/or may fluctuate (e.g., may be noisy) because the interval of time has not passed. However, the media application 451 may still be able to continue playback of the digital video asset and prevent decoding errors because the media application 451 is able fetch specific frames (e.g., frames with a higher importance level) using the graph. After the media application 451 has fetched frames for the interval of time, the estimated bandwidth may be more stable and/or accurate because temporary changes in bandwidth will affect the estimated bandwidth less. In one embodiment, the estimated bandwidth may be updated periodically. For example, the estimated bandwidth may be updated (e.g., recalculated) each time a frame is fetched or at regular intervals (e.g., every 2 seconds, every 5 seconds, every minute, etc.).

In one embodiment, the media application 451 may analyze the graph based on the estimated bandwidth and the amount of available space (e.g., the amount of free space) in the buffer. The media application may identify a sub-set or a sub-graph of the graph (e.g., may prune the graph) based on the estimated bandwidth and the amount of available space. The media application 451 may identify a sub-set (e.g., a sub-graph) of the graph starting at the nodes that are associated with a current playtime of the digital video asset (e.g., the current point of the digital video asset that is being viewed). For example, referring to FIG. 2, the media application 451 may currently be displaying the frame represented by node 211D. The media application 451 may identify a sub-set 250 of the nodes in the graph 200 beginning at nodes 211D, 221D, and 231D. The size of the sub-set 250 (e.g., the sub-graph) may be based on one or more of the estimated bandwidth and the amount of available space in the buffer.

In one embodiment, the media application 451 may identify a set of frames that provides the best video quality based on the sub-set of the graph. For example, if the estimated bandwidth is low, the media application 451 may identify frames from a lower quality representation (e.g., may switch to the lower quality representation at a switching point) using the sub-set of the graph because the estimated bandwidth may not be enough to fetch frames from a higher quality representation while keeping the buffer non-empty. In another example, if the estimated bandwidth is higher and the amount of available space in the buffer is higher, the media application 451 may identify frames from a higher quality representation (e.g., may switch to the higher quality representation at a switching point) using the sub-set of the graph because the estimated bandwidth is enough to fetch the larger frames of the higher quality representation and the buffer has enough space to store the larger frames. In a further example, if the estimated bandwidth is low and the amount of space available in the buffer is low, the media application 451 may identify a set of frames based on their importance (e.g., the two i-frames bracketing a Group of Pictures (GOP) may be fetched first, followed by the p-frames) using the sub-set of the graph.

It should be understood that various methods, algorithms, equations, and/or functions may be used to identify set of frames that provides the best video quality based on the sub-set of the graph. Other embodiments may use any combination of methods, algorithms, equations, and/or functions to identify set of frames that provides the best video quality based on the sub-set of the graph In one embodiment, the media application 451 may fetch the frames identified using the sub-set of the graph based on the importance levels of the frames and the temporal order of the frames. For example, the media application may fetch frames with high importance level (e.g., i-frames) in temporal order, followed by frames with medium importance level (e.g., p-frames) in temporal order, followed by frames with low importance level (e.g., b-frames) in temporal order. The media application 451 may also fetch frames that are not in consecutive order (e.g., may fetch frames that are out of temporal order).

In one embodiment, the media application 451 may periodically re-identify sub-sets of the graph. For example, the media application 451 may identify a sub-set of the graph every few seconds, every minute, etc. In another example, the media application 451 may identify a sub-set of the graph each time a frame is fetched. The additional sub-sets may also begin at the current playtime of the digital video asset (e.g., the sub-sets may slide forward or down on the graph when the playtime has progressed) and the size of the additional sub-sets may also be based on the estimated bandwidth and the available space in the buffer.

In one embodiment, errors may occur when the media application 451 fetches frames (e.g., requests and/or receives frames from the media server 410). One type of error may be that the requested frame is unavailable. For example, the media server 410 may be inoperative (e.g., down). Another type of error may be that the media server 410 or may be unreachable (e.g., there is no route to the media server 410). A further type of error may be that the requested frame cannot be fetched due to congestion on the network 405 and/or 406. Errors may cause a request for a frame (e.g., a request for an NDN object) to time out. For example, a request for a frame may time out if the requested frame is not received within a certain period of time. When an error occurs for a frame, the media application 451 may remove the node associated with the frame from the graph. The media application 451 may also re-analyze the graph to determine whether subsequent frames of the digital video asset may still be decoded (e.g., whether the digital video asset may still be properly displayed to a user). For example, the media application may re-identify a subset of the graph and may re-identify a set of frames after removing the node associated with the frame from the graph.

The system architecture 400 also includes routers 430. Routers 430 may be communication devices (e.g., computing devices such as routers, switches, etc.) that may route and/or forward data between the media server 410 and the client device 450. For example, router 430 may receive a request for a frame (e.g., an interest packet) and may forward the request to the media server 410. The media server may receive the request and may send the frame (e.g., an NDN data object) to the client device 450 based on the request. Each router 430 may include a cache 441. As discussed above, the system architecture 400 may be an NDN system architecture. The NDN system architecture may allow the routers 430 to store (e.g., cache) NDN data objects (e.g., frames or chunks of frames) in their respective caches 441. When a router 430 receives a request (e.g., an interest packet) for an NDN data object from the client device 450 and the router 430 has the NDN data object stored in its cache 441, the router 430 may transmit the NDN data object toward the client device 450 in response to the request instead of forwarding the request to the media server 410. This may reduce the amount of processing performed by the media server 410 and may reduce the amount of network congestion in the network 405. In one embodiment, the caches 441 may also allow multi-path and multi-destination routing without using domain name system (DNS) lookups, load balancers, and proxies.

In one embodiment, the system architecture 400 may reduce congestion and/or bandwidth usage because routers may cache the data and may also provide the data to consumers. The system architecture may also allow the client device 450 to improve and/or optimize the playback of the digital video asset on a frame-by-frame basis. This may also allow for error concealment rather than stalls when the consumer is unable to fetch (e.g., request and receive) all of the frames or a portion of the digital video asset. In addition, if there are errors in fetching a frame (e.g., a frame is corrupted or not received), the system architecture 400 may further reduce congestion and/or bandwidth usage because the client device 450 may re-request a specific frame, instead of requesting an entire or partial segment (e.g., multiple frames) of the digital video asset. The system architecture may also reduce the amount of processing load for the media server 410 because the media server may offload the determination of whether to switch representations and which frames to request to the client device 450. In addition, the media server 410 may process fewer requests for frames because the routers 430 may cache NDN data objects and may provide the NDN data objects to the client device directly.

Although the present disclosure may refer to the NDN system architecture, it should be understood that the NDN system architecture is merely an example architecture that may be used in an ABR system architecture. Other embodiments, may use other types of system architectures (e.g., CCN, Pursuit, NetInf, etc.) in the ABR system architecture.

Figure 5:
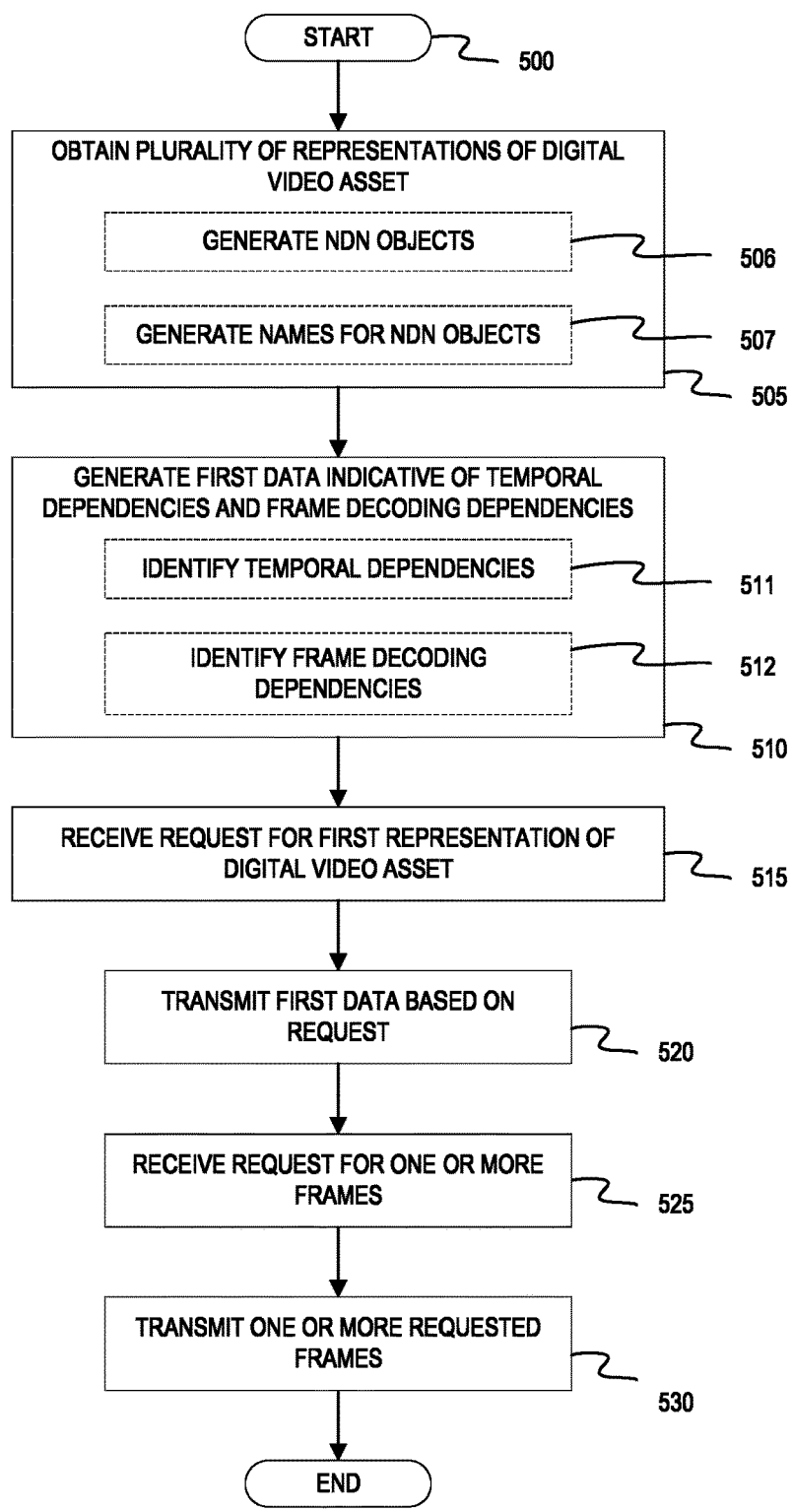
FIG. 5 is a flowchart representation of a method of providing frames to a client device, in accordance with some embodiments.

FIG. 5 is a flowchart representation of a method 500 of providing frames to a client device, in accordance with some embodiments. In some implementations, the method 500 may be performed by a video asset module (as illustrated in FIG. 4) and/or one or more computing devices (e.g., one or more server computers such as media server 410 illustrated in FIG. 4). Briefly, method 500 includes obtaining a plurality of representations of a digital video asset, generating first data indicating dependencies of frames in the digital video asset, and transmitting the first data to a client device. The method 500 begins at block 505 where the method 500 obtains a plurality of representations of a digital video asset (e.g., obtains representations 110, 120, and 130 of the digital video asset 100 illustrated in FIG. 1). In some embodiments, obtaining the plurality of representations includes generating a plurality of NDN objects at block 506. For example, the method 500 may generate an NDN object for each frame in the digital video asset. In another example, the method 500 may divide each frame into chunks (e.g., portions of a frame) and may generate an NDN object for each chunk. In another embodiment, the method 500 may generate a CCN object for each frame in the digital video asset. In some embodiments obtaining the plurality of representations includes generating names for the NDN objects at block 507. For example, the method 500 may generate an NDN name for each frame of the digital video asset (as discussed above in conjunction with FIGS. 1-4). In another embodiment, the method 500 may generate a CCN name for each frame in the digital video asset.

The method 500 may generate first data indicative of temporal dependences and frame decoding dependencies of the frames of the digital video asset at block 510. For example, the method 500 may generate a manifest file that includes a graph (e.g., graph 200 illustrated in FIG. 2) that includes the frames of the digital video asset as nodes and represents the temporal dependences and frame decoding dependencies as arcs (e.g., lines or edges) between the nodes. The graph may be an acyclic directed graph. In another example, the method 500 may also generate other data (e.g., other data structures or files) that represent and/or include the graph. In some embodiments, generating first data may include identifying the temporal dependencies of the frames of the digital video asset at block 511. For example, the method 500 may analyze the PTSs of the frames to determine the temporal order of the frames. In some embodiments, generating first data may include identifying the frame decoding dependencies of the frames of the digital video asset at block 512. For example, the method 500 may analyze each frame of the digital video asset to determine whether the frame depends on other frames to be decoded properly.

The method 500 may receive a request for a first representation of the digital video asset from a client device at block 515. For example, referring back to FIG. 4, the method 500 may receive a request (e.g., an interest packet) for first representation of the digital video asset from client device 450 (e.g., from media application 451). At block 520, the method 500 may transmit the first data (e.g., a manifest file including the graph and/or other data representing the graph) to the client device 450 based on (e.g., in response to) the request for the first representation of the digital video asset. At block 525 the method 500 may receive one or more requests for one or more corresponding frames of the digital video asset (as discussed above in conjunction with FIGS. 1-4). For example, the method 500 may receive a first set of requests (e.g., a first set of interest packets) for frames associated with a first importance level and may receive a second set of requests for frames associated with a second importance level. In another example, the method 500 may receive requests for frames that are not in temporal presentation order (e.g., frames that are out of order). In a further example, the method 500 may receive request for frames that are from a different representation of the digital video asset. At block 525, the method 500 transmits the one or more requested frames to the client device based on the one or more requests.

Figure 6:
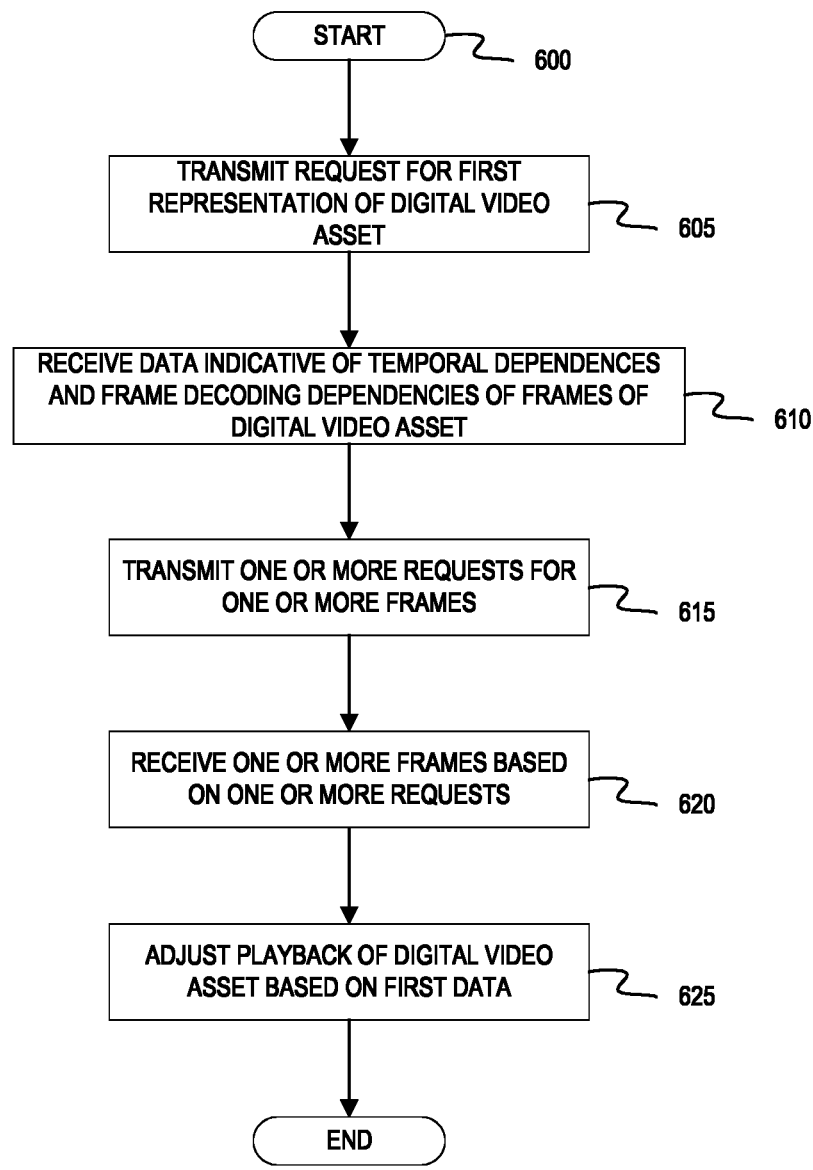
FIG. 6 is a flowchart representation of a method of playing a digital video asset, in accordance with some embodiments.

FIG. 6 is a flowchart representation of a method 600 of playing a digital video asset, in accordance with some embodiments. In some implementations, the method 600 may be performed by a media application (e.g., media application 451 illustrated in FIG. 4) and/or one or more computing devices (e.g., client device 450 illustrated in FIG. 4). Briefly, method 600 includes requesting a first representation of a digital video asset, receiving first data indicating dependencies of frames in the digital video asset, receiving one or more frames of the digital video asset, and adjusting playback of the digital video asset. The method 600 begins at block 605 where the method 600 transmits a request (e.g., transmits an interest packet) for a first representation of a digital video asset. For example, referring back to FIG. 4, the media application 451 may transmit a request for a first representation of the digital video asset to the media server 410. At block 610, the method 600 receives first data indicative of temporal dependences and frame decoding dependencies of the frames of the digital video asset. For example, the method 600 may receive an NDN data object that includes a graph and/or a manifest file that represents the graph (as illustrated in to FIGS. 2 and 3).

At block 615, the method 600 may transmit one or more requests (e.g., one or more interest packets) for one or more frames. For example, referring back to FIG. 4, the media application 451 may transmit one or more requests for one or more frames to the media server 410 and/or the routers 430. The method 600 may receive one or more frames (e.g., may receive one or more NDN objects that include the one or more frames and/or chunks of the one or more frames) at block 620. For example, referring back to FIG. 4, the media application 451 may receive the one or more frames from the media server 410 and/or the routers 430. At block 630, the method 600 may adjust the playback of the digital video asset based on the first data. For example, as discussed above in conjunction with FIG. 4, the method 600 may identify a sub-graph of the graph based on the amount of buffer space available to the media application 451 and the estimated bandwidth for a client device 450. The method 600 may identify a set of frames that provides improved, better, and/or optimal video quality based on the sub-set of the graph (as discussed above in conjunction with FIGS. 1-4). For example, the media application 451 may be playing a high quality representation of the digital video asset. The playback of the high quality representation may stall or stop because the bandwidth of the client device 450 may decrease and the media application may be unable to fetch the larger frames of the high quality representation. The method 500 may improve or optimize the playback by switching playback to a lower quality representation and/or requesting frames with a higher importance level first.

Figure 7:
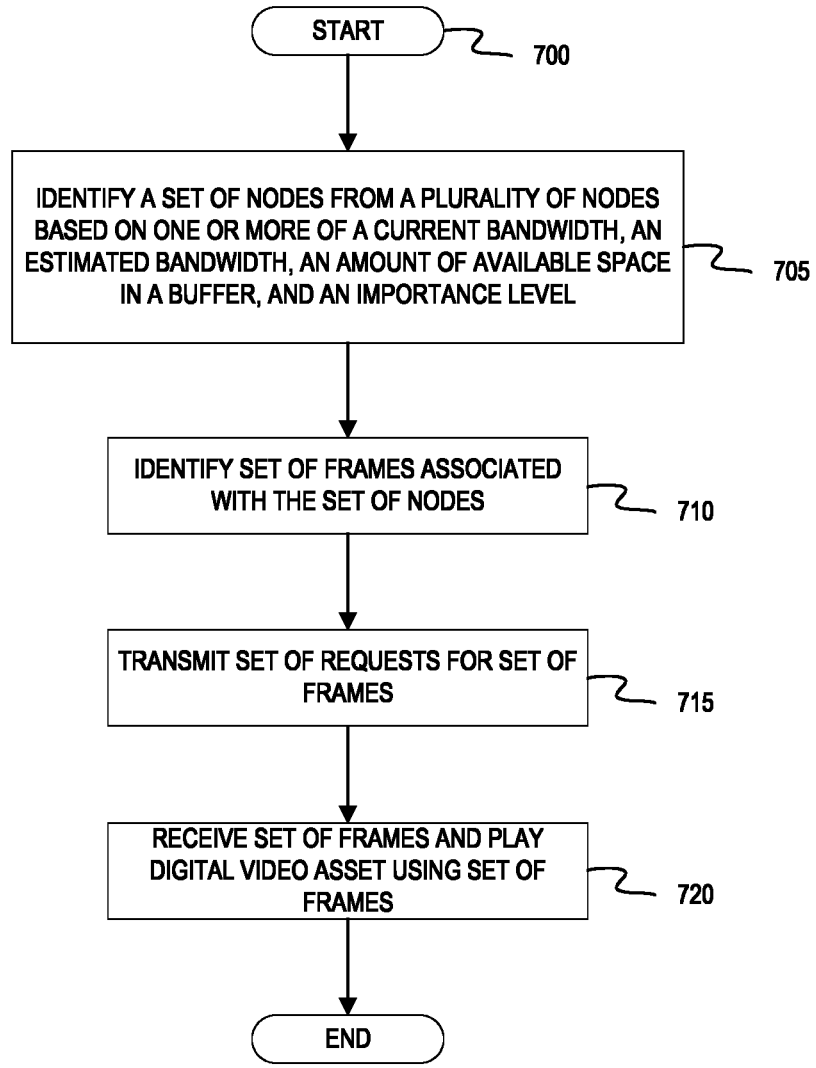
FIG. 7 is a flowchart representation of a method of adjusting the playback of a digital video asset, in accordance with some embodiments.

FIG. 7 is a flowchart representation of a method 700 of adjusting the playback of a digital video asset, in accordance with some embodiments. In some implementations, the method 700 may be performed by a media application (e.g., media application 451 illustrated in FIG. 4) and/or one or more computing devices (e.g., client device 450 illustrated in FIG. 4). Briefly, method 700 includes identifying a set of nodes from a plurality of nodes, identifying a set of frames associated with the set of nodes, requesting the set of frames, and using the set of frames to play the digital video asset. At block 705, the method 700 identifies a set of nodes from a plurality of nodes (e.g., identifies nodes in sub-set 250 from the nodes in the graph 200, as illustrated in FIG. 2) based on one or more of a current bandwidth, an estimated bandwidth, an amount of available space in a buffer used by the media application 451, and an importance level. For example, the method 500 may identify a set of nodes associated with frames from a different representation based on the estimated bandwidth and the available amount of space in the buffer. In another example, the method 700 may identify a set of nodes associated with frames with a higher importance level based on the estimated bandwidth and the available amount of space in the buffer. In a further example, the method 700 may identify a set of nodes associated with frames that are not in consecutive order based on the estimated bandwidth and the available amount of space in the buffer.

At block 710, the method 700 may identify a set of frames associated with the set of nodes identified at block 705. As discussed above in conjunction with FIGS. 1-5, the set of frames (associated with the set of nodes) may provide improved, better, and/or optimal video quality when playing the digital video asset. At block 715, the method 700 may transmit a set of requests for the set of frames. For example, the method 700 may transmit a set of interest packets for the set of frames. At block 720, the method 700 receives the set of frames and may play the digital video asset using the set of frames. For example, the method 700 may receive NDN objects that include the set of frames or chunks of the set of frames and may play the digital video using the set of frames.

Figure 8:
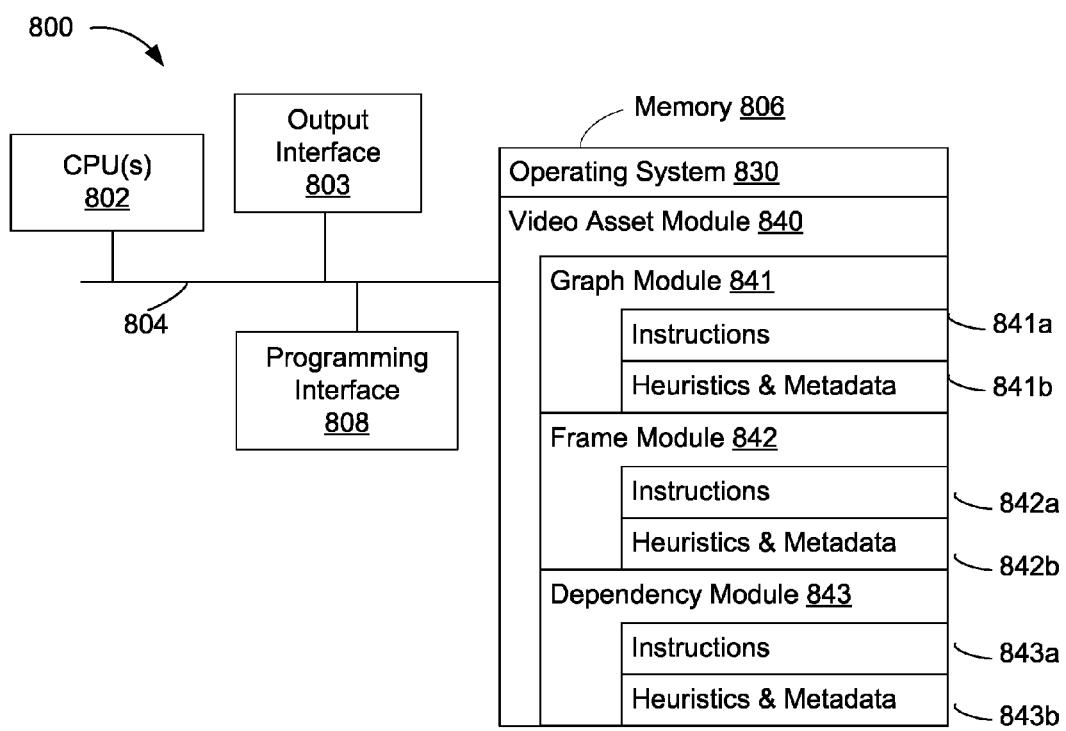
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a video asset module 840. In some embodiment, one or more instructions are included in a combination of logic and non-transitory memory. The operating system 830 includes procedures for handling various basic system services and for performing hardware dependent tasks. In some embodiments, the video asset module 840 may be configured to obtain representations of a digital video asset, generate first data (e.g., a graph or a manifest file) indicative of temporal dependencies and frame decoding dependencies for the frames of the digital video asset, transmitting the first data to a client device, and transmitting frames to the client device. To that end, the video asset module 840 includes a graph module 841, a frame module 842, and a dependency module 843.

In some embodiments, the dependency module 843 is configured to identify temporal dependencies and/or frame decoding dependencies of the frames of the digital video asset. To that end, the dependency module 843 includes a set of instructions 843*a* and heuristics and metadata 843*b*. In some embodiments, the graph module 841 is configured to generate the first data (e.g., a graph or a manifest file) indicative of the temporal dependencies and the frame decoding dependencies for the frames of the digital video asset. The graph module 841 may also be configured to provide the first data to a client device. To that end, the graph module 841 includes a set of instructions 841*a* and heuristics and metadata 841*b*. In some embodiments, the frame module 842 may be configured to receive requests for one or more frames (e.g., receive interest packets) and transmit the one or more frames to client devices based on the requests. To that end, the frame module 842 includes a set of instructions 842*a* and heuristics and metadata 842*b*.

Although the video asset module 840, the graph module 841, the frame module 842, and the dependency module 843 are illustrated as residing on a single computing device 800, it should be understood that in other embodiments, any combination of the video asset module 840, the graph module 841, the frame module 842, and the dependency module 843. For example, each of the graph module 841, the frame module 842, and the dependency module 843 may reside on a separate computing device.

Figure 9:
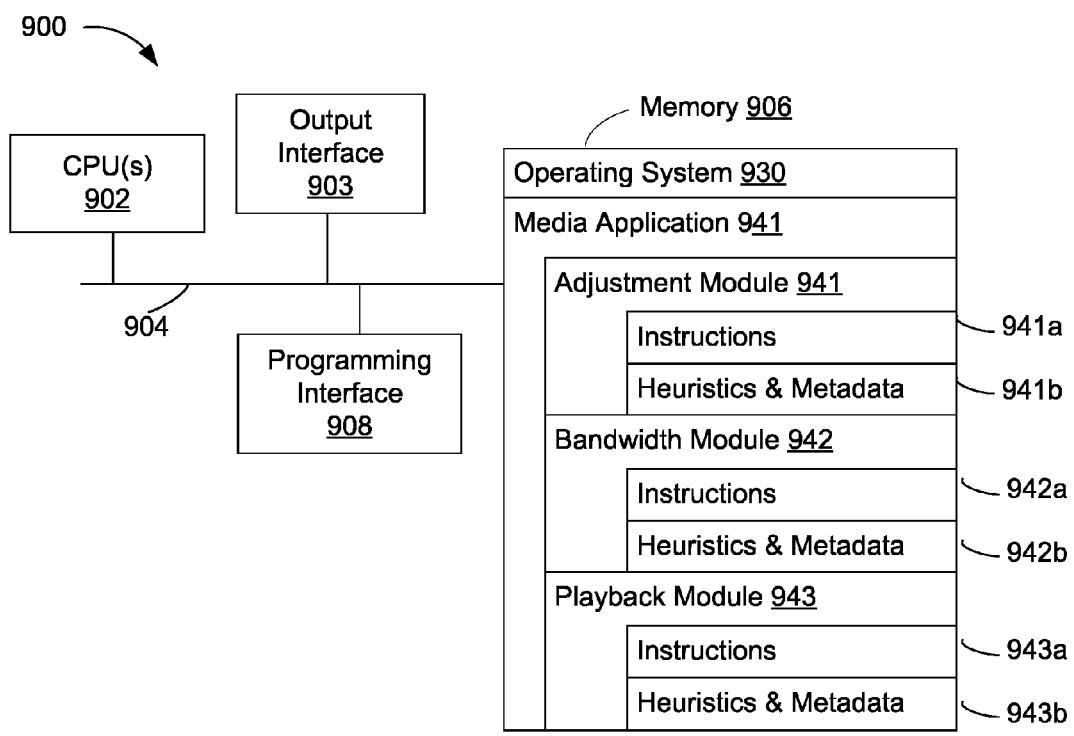
FIG. 9 is a block diagram of a computing device, in accordance with some embodiments.

FIG. 9 is a block diagram of the computing device 900 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a media application 940. In some embodiment, one or more instructions are included in a combination of logic and non-transitory memory. The operating system 930 includes procedures for handling various basic system services and for performing hardware dependent tasks. In some embodiments, the media application 940 may be configured to request frames of a digital video asset, analyze data indicative of temporal dependencies and frame decoding dependencies for the frames of the digital video asset, and adjust playback of the digital video asset. To that end, the media application 940 includes an adjustment module 941, a bandwidth module 942, and a playback module 943.

In some embodiments, the bandwidth module 942 is configured to determine an estimated bandwidth and/or a current bandwidth of the computing device 900. To that end, the bandwidth module 942 includes a set of instructions 942*a* and heuristics and metadata 942*b*. In some embodiments, adjustment module 941 is configured to identify sets of nodes (e.g., sets of frames) based on one or more of the current bandwidth, the estimated bandwidth, an amount of space available in a buffer used by the media application 940, and importance levels of the frames in the digital video asset. To that end, the adjustment module 941 includes a set of instructions 941*a* and heuristics and metadata 941*b*. In some embodiments, the playback module 943 is configured to send requests (e.g., interests packets) for frames, receive the requested frames (e.g., receive NDN data objects), and play the digital video asset based on the received frames. To that end, the playback module 943 includes a set of instructions 943*a* and heuristics and metadata 943*b*.

Although the media application 940, the adjustment module 941, the bandwidth module 942, and the playback module 943 are illustrated as residing on a single computing device 900, it should be understood that in other embodiments, any combination of the media application 940, the adjustment module 941, the bandwidth module 942, and the playback module 943 may reside on separate computing devices. For example, the media application 940, the adjustment module 941, the bandwidth module 942, and the playback module 943 may reside on a separate computing device.

Moreover, FIGS. 8 and 9 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 8 and 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    obtaining a plurality of representations of a digital video asset, wherein the plurality of representations comprise a plurality of video frames;
    generating an acyclic directed graph comprising a plurality of nodes representing the plurality of video frames and a plurality of arcs representing temporal dependencies and frame decoding dependencies between each video frame of the plurality of video frames, wherein the frame decoding dependencies comprise a plurality of switching points between the plurality of representations of the digital video asset, wherein a first arc of the plurality of arcs is associated with a first switching point from the plurality of switching points and wherein the first arc comprises a quality loss metric;
    receiving, from a first computing device, a request for a first representation of the plurality of representations of the digital video asset; and
    transmitting, to the first computing device, the acyclic directed graph in response to receiving the request.

2. The method of claim 1, wherein obtaining the plurality of representations of the digital video asset comprises:
    generating a plurality of named domain network (NDN) data objects, wherein each NDN data object of the plurality of NDN data object comprises at least a portion of a video frame of the plurality of video frames; and
    generating a plurality of NDN names for the plurality of video frames, wherein the plurality of NDN names identifies the plurality of video frames.

3. The method of claim 1, wherein obtaining the plurality of representations of the digital video asset comprises:
    generating a plurality of content centric networking (CCN) data objects, wherein each CCN data object of the plurality of CCN data object comprises at least a portion of a video frame of the plurality of video frames; and
    generating a plurality of CCN names for the plurality of video frames, wherein the plurality of CCN names identifies the plurality of video frames.

4. The method of claim 1, wherein each node of the plurality of nodes comprises a storage size of a video frame, an importance level of the video frame, and one or more video quality metrics associated with the video frame.

5. The method of claim 1, further comprising:
    receiving, from the first computing device, a first set of requests for a first set of video frames of the first representation, wherein each video frame in the first set of video frames is associated with a first importance level; and
    transmitting, to the first computing device, the first set of video frames in response to receiving the first set of requests.

6. The method of claim 1, further comprising:
    receiving, from the first computing device, a plurality of requests for a plurality of video frames, wherein the plurality of video frames are not in consecutive order; and
    transmitting, to the first computing device, the plurality of video frames in response to receiving the plurality of requests.

7. The method of claim 1, wherein transmitting the acyclic directed graph comprises:
    transmitting a manifest file comprising the acyclic directed graph.

8. A method comprising:
    transmitting, to a first computing device, a request for a first representation of a plurality of representations of a digital video asset, the plurality of representations comprising a plurality of video frames; and
    receiving, from the first computing device in response to transmitting the request, an acyclic directed graph comprising a plurality of nodes representing the plurality of video frames and a plurality of arcs representing temporal dependencies and frame decoding dependencies between each video frame of the plurality of video frames, wherein the frame decoding dependencies comprise a plurality of switching points between the plurality of representations of the digital video asset, wherein a first arc of the plurality of arcs is associated with a first switching point from the plurality of switching points and wherein the first arc comprises a quality loss metric.

9. The method of claim 8, further comprising:
    transmitting, to the first computing device, a request for a first video frame of the first representation; and
    receiving, from the first computing device in response to transmitting the request, the first video frame of the first representation.

10. The method of claim 9, wherein receiving the first video frame of the first representation comprises:
    receiving a named domain network (NDN) data object comprising at least a portion of the first video frame.

11. The method of claim 8, wherein receiving the acyclic directed graph comprises:
    receiving a manifest file comprising the acyclic directed graph.

12. The method of claim 8, wherein each node of the plurality of nodes comprises a storage size of a video frame, an importance level of the video frame, and one or more video quality metrics of the video frame.

13. The method of claim 8, further comprising:
    adjusting playback of the digital video asset based on the acyclic directed graph.

14. The method of claim 13, wherein adjusting playback of the digital video asset comprises:

identifying a set of nodes from the plurality of nodes based on one or more of a current bandwidth, an estimated bandwidth, or an amount of available space in a buffer;

identifying a set of video frames associated with the set of nodes; and transmitting, to the first computing device, a set of requests for the set of video frames.

15. The method of claim 13, wherein adjusting playback of the digital video asset comprises:

identifying a set of nodes from the plurality of nodes, wherein each node is associated with a same importance level;

identifying a set of video frames associated with the set of nodes; and transmitting, to the first computing device, a set of requests for the set of video frames.

16. The method of claim 13, wherein adjusting playback of the digital video asset comprises:

identifying a set of nodes from the plurality of nodes;

identifying a set of video frames associated with the set of nodes, wherein the set of video frames is not in consecutive order; and transmitting, to the first computing device, a set of requests for the set of frames.

17. The method of claim 13, wherein adjusting playback of the digital video asset comprises:

determining that at least one requested video frame for a portion of the first representation was not received; and continuing playback of the portion of the digital video asset using received video frames for the portion of the first representation.

18. The method of claim 8, further comprising:

transmitting, to the first computing device, a request for a first video frame of the first representation;

determining that the first video frame was not received during a period of time; and re-transmitting, to the first computing device, the request for the first video frame.

19. An apparatus, comprising:

one or more processors; and a memory comprising instructions that when executed cause the one or more processors to perform operations comprising:

obtaining a plurality of representations of a digital video asset, wherein the plurality of representations comprise a plurality of video frames;

generating an acyclic directed graph comprising a plurality of nodes representing the plurality of video frames and a plurality of arcs representing temporal dependencies and frame decoding dependencies between each video frame of the plurality of video frames, wherein the frame decoding dependencies comprise a plurality of switching points between the plurality of representations of the digital video asset, wherein a first arc of the plurality of arcs is associated with a first switching point from the plurality of switching points and wherein the first arc comprises a quality loss metric;

receiving, from a first computing device, a request for a first representation of the digital video asset; and transmitting, to the first computing device, the acyclic directed graph in response to receiving the request.

* * * * *